United States Patent

[11] 3,550,730

| [72] | Inventors | Paul M. Douglas<br>Garden City;<br>William S. Nagel, Franklin, Mich. |
|---|---|---|
| [21] | Appl. No. | 852,998 |
| [22] | Filed | Aug. 26, 1969 |
| [45] | Patented | Dec. 29, 1970 |
| [73] | Assignee | Eaton Yale & Town Inc.<br>Cleveland, Ohio<br>a corporation of Ohio<br>Continuation of application Ser. No.<br>616,550, Feb. 16, 1967, now abandoned. |

[54] FLUID BRAKE SYSTEM
26 Claims, 8 Drawing Figs.

[52] U.S. Cl. .................................................. 188/152,
60/52, 137/596.1, 303/6
[51] Int. Cl. .................................................... B60f 13/18
[50] Field of Search .......................................... 188/152.11,
152.41, 152.49, 152.02, 152.04; 303/6; 60/52.5B;
137/596.1

[56] References Cited
UNITED STATES PATENTS

| 2,289,563 | 7/1942 | Wood et al. | (188/152(.11)UX |
|---|---|---|---|
| 3,305,051 | 2/1967 | Maurice. | |
| 3,338,351 | 8/1967 | Lepelletier. | |
| 3,349,875 | 10/1967 | Stelzer.......................... | 188/152(.11) |
| 3,367,457 | 2/1948 | Lepelletier.................... | 188/152(.04) |

FOREIGN PATENTS

| 1,146,888 | 5/1957 | France. | |

Primary Examiner—George E. A. Halvosa
Attorney—Yaunt, Flynn & Faralli

ABSTRACT: A brake system applies a greater braking force to the trailing brake shoe at each wheel than is applied to the leading brakeshoe. The added force applied to the trailing brakeshoe is delivered to the trailing brakeshoe from an intensifier unit. The intensifier unit receives a signal from a control unit and the control unit is effective to deliver pumping fluid to the intensifier unit. A tandem master cylinder has one chamber connected with the control unit, and the control unit receives a signal from the tandem master cylinder which actuates the delivery of steering pump fluid to the intensifier unit. The control unit includes a signal valve which receives the signal from the master cylinder, a servovalve and a rate control valve for directing the steering pump fluid to the intensifier unit.

INVENTORS
PAUL M. DOUGLAS
WILLIAM S. NAGEL
BY
Yount, Raney, Flynn, and Tarolli
ATTORNEYS

FLUID BRAKE SYSTEM

The present application is a continuation of application Ser. No. 616,550, filed Feb. 16, 1967, and which is now abandoned.

The present invention relates to a fluid system, and particularly relates to a fluid brake system for a vehicle.

A standardized "duoservo" fluid brake system includes a brake pedal and a master cylinder for brake fluid cooperating therewith. When the brake pedal is depressed, a fluid pressure is provided in brake cylinders at the wheels of the vehicle. The brake cylinders at the wheels effect movement of brakeshoes outwardly into engagement with the brake drum. A pair of brakeshoes are associated with each brake drum, and when the vehicle is moving in a forward direction one of the brakeshoes may be termed the "leading" brakeshoe and the other may be termed the "trailing" brakeshoe. Normally, the forces applied to the leading and trailing brakeshoes are substantially equal but due to reaction forces on the shoes only the leading shoe is actuated. However, due to the direction of rotation of the brake drum. the force applied to the leading brakeshoe is multiplied. This multiplied force is received from the trailing shoe by an anchor pin.

One problem in a standard brake system is the problem of brake fade. This problem centers around changes in the coefficient of friction between the brake drum and brakeshoes. When this coefficient of friction changes, the braking effort or braking torque applied to the wheels will also change, if wheel cylinder force is constant. It is, as a practical matter, difficult to prevent a change in the coefficient of friction between the brakeshoes and the brake drum in view of the fact that changing weather conditions, wear, and lining and drum temperatures, all have a direct effect on this coefficient of friction.

In accordance with the present invention, it has been discovered that by applying a greater force to the trailing brakeshoe to actuate it to its braking condition than is applied to the leading brakeshoe, the effect on braking of changes in the coefficient of friction are minimized, thus minimizing brake fade. This greater force to be applied to the trailing brakeshoe is at least as great as the multiplied force, noted above, and preferably is somewhat greater to provide a power brake. The advantage of minimizing brake fade is achieved by the present invention by applying a force to a piston member which actuates the trailing brakeshoe. In one mode of operation, a force is applied to the trailing brakeshoe and is derived from power steering pump pressure which actuates an intensifier unit which, in turn, applies the pressure to the piston member for actuation of the trailing brakeshoe. A control unit is provided for controlling the pressure and the flow of pumping fluid to the intensifier unit in accordance with a signal received from the master cylinder.

The principal object of the present invention is the provision of a new and improved brake system wherein effects of changes in the coefficient of friction between the brakeshoes and the brake drum are minimized due to the novel application to the brakeshoes of the forces which actuate and hold the brakeshoes in braking condition.

A further object of the present invention is the provision of a new and improved brake system wherein a force is applied to the leading and trailing brakeshoes to actuate them to their braking condition with the braking force applied to the trailing brakeshoe being substantially greater than that applied to the leading brakeshoe.

Another object of the present invention is the provision of a new and improved brake system, as noted above, wherein the force applied to the trailing brakeshoe is greater than the reaction force of a normal "duoservo" brake system, as aforementioned.

A still further object of the present invention is the provision of a new and improved fail safe brake system wherein a brake cylinder mechanism is operable to apply a force to the brakeshoes to actuate the brakeshoes to their braking condition and wherein the brake cylinder mechanism includes a pair of pistons with a fluid chamber therebetween which receives fluid pressure to apply a force on the pistons and wherein an additional fluid chamber is provided and fluid in that chamber acts on only one of the pistons to apply a greater force to that piston than is applied to the other piston.

Another object of the present invention is the provision of a new and improved brake system utilizing a tandem or dual master cylinder where one of the master cylinder chambers is connected to deliver fluid to the brake cylinders and wherein the other chamber of the master cylinder is connected with a control unit which controls an intensifier unit and wherein the intensifier unit delivers a fluid pressure to the piston for actuating the trailing brakeshoes of the brake system with a force which is substantially greater than the force with which the piston of the leading brakeshoe is actuated.

Still another object of the present invention is the provision of a new and improved brake system utilizing power steering pump pressure for controlling an intensifier unit and wherein the intensifier unit receives steering pump fluid at a given pressure and operates to deliver brake fluid to the braking mechanism at an increased pressure and wherein the system is so constructed and arranged as to always provide a minimum back pressure on the power steering pump.

A further object of the present invention is the provision of a new and improved brake system utilizing a control unit which receives a signal from the master cylinder and which provides a fluid signal to an intensifier unit which, in turn, delivers the signal to the brake mechanism and wherein the control unit includes a valve responsive to the master cylinder pressure and which is moved in response thereto and a second valve which is actuated in response to movement of the first valve to direct steering fluid to the intensifier unit.

A still further object of the present invention is the provision of a new and improved brake system, as noted in the next preceding paragraph, wherein the servovalve tends to move from its normal position in one direction upon a demand for steering pump fluid by the steering mechanism to allow steering pump fluid to flow thereto and tends to move in the opposite direction upon a demand for braking and wherein the servovalve when in its normal position creates no pressure demand on the steering pump and when moving in the above opposite direction, creates a pressure demand on the steering pump so that steering pump pressure is available for braking purposes whether or not the operator of the vehicle is steering the vehicle when braking is required.

Still a further object of the present invention is the provision of a of a new and improved brake system which is constructed so as to apply a greater brake actuating force to the trailing brakeshoe of a vehicle than to the leading brakeshoe when the vehicle is going in a forward direction, but which includes means for preventing the application of this greater force to the trailing brakeshoe when the automotive vehicle is moving in a reverse direction.

Further objects and advantages of the present invention will be apparent to those skilled in the art to which it relates from the following detailed description of the preferred embodiment thereof made with reference to the accompanying drawings forming a part of this specification and in which:

The present invention provides an improved brake system for use in vehicles, and in particular provides an improved power brake system utilizing fluid for actuation of brakeshoes of the system to effect braking of the vehicle. The improved brake system is constructed so as to minimize the effects of changes in the coefficient of friction between the brakeshoes and their associated brake drums.

Figures 1, 3, 8:
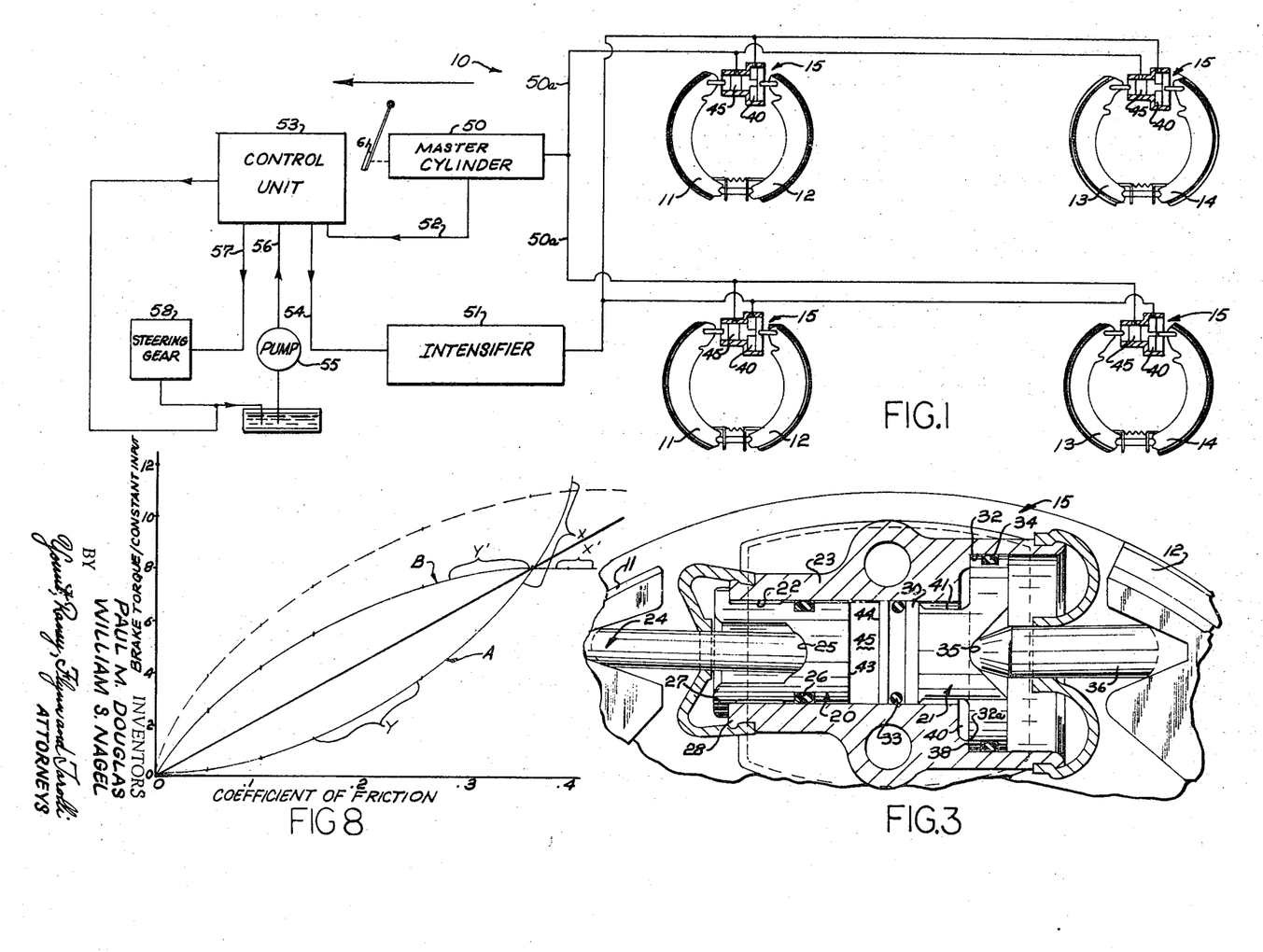
FIG. 1 is a hydraulic circuit drawing of a brake system embodying the present invention.
FIG. 3 is a fragmentary sectional view of the brake cylinder mechanisms forming a part of the brake system illustrated in FIG. 1.
FIG. 8 is a graph showing certain operating characteristics of the brake system of FIG. 1 and the operating characteristics of a leading shoe or "duoservo" brake system.

As representing the preferred embodiment of the present invention, FIG. 1 of the drawings illustrates a braking system 10. The braking system 10 includes front brakeshoes 11 and 12 for each of the front wheels, and rear brakeshoes 13 and 14 for each of the rear wheels of the vehicle. The brakeshoes 11 and 13 at the front and rear wheels, respectively, are the leading brakeshoes when the car is going in a forward direction, whereas the brakeshoes 12 and 14 are the trailing brakeshoes for the vehicle when the car is going in a forward direction. The particular construction of the brakeshoes, per se, does not form a part of the present invention and the brakeshoes have been shown schematically herein. The brakeshoes, however, are pivotally interconnected and are also rotatably shiftable somewhat relative to the vehicle wheel, as will be described hereinbelow.

Each set of brakeshoes at each wheel is associated with a brake cylinder mechanism 15. Each brake cylinder mechanism 15 is constructed so as to deliver a force to the leading and trailing brakeshoes so as to actuate the brakeshoes to their braking condition in which the brakeshoes forcibly engage the cooperating brake drum to effect braking of the vehicle. All of the brake cylinder mechanisms 15 are hydraulically similar and only one will be described herein in detail, namely, the brake cylinder mechanism 15 for a set of front brakeshoes 11, 12 shown in FIG. 3. The same reference characters are used on the drawings to designate the corresponding parts of each of the cylinder mechanisms 15.

The brake cylinder mechanism 15, as shown in FIG. 3, includes a pair of piston members 20, 21. The piston member 20 slides in a bore 22 of a housing member 23. The piston member 20 is operatively associated with an actuating rod 24 which has one end seated in an arcuate seat 25 in the piston member 20. The other end of the actuating rod 24 is operatively connected with the brakeshoe 11 so as to actuate the brakeshoe 11. A suitable O-ring 26 or other suitable sealing means is carried by the piston 20 and provides a seal between the bore 22 and the piston 20. The left end of the piston 20, as viewed in FIG. 3, is flared somewhat so as to provide a shoulder 27 which engages the outer tip 28 of the housing 23 to limit the inward position of the piston 20 in the bore 22.

The piston 21 has a stem portion 30 slidably received in the bore 22 of the housing member 23. The piston 21 also has an enlarged portion 31 slidable in a bore 32 in the housing member 23. A suitable O-ring 33, or other seal means is carried by the stem portion 30, and an O-ring 34 is carried by the enlarged portion 31 of the piston member 21. The piston 21 has a conical seat 35 in the outer surface thereof in which is seated an actuating rod 36. The other end of the actuating rod 36 is operatively associated with the trailing brakeshoe 12 so as to effect outward movement of the trailing brakeshoe 12 upon actuation of the piston. The piston 21 is shown in its retracted position in FIG. 3. When in its retracted position, the surface 38 of the enlarged portion 31 of the piston member 21 engages or abuts the surface 32a of the housing member 23, as illustrated in FIG. 3.

The piston members 20, 21 when in their retracted conditions have rear faces 43, 44 spaced apart to define a fluid chamber 45 therebetween. Fluid delivered to the chamber 45 tends to move the piston members 20, 21 in opposite directions outwardly away from each other and to actuate the brakeshoes 11, 12 into their braking condition to effect braking of the vehicle.

The piston member 21 and the housing member 23 also define an annular fluid chamber 40. The annular fluid chamber 40 is defined in part by the enlarged portion 31 of the piston member and a necked down portion 41 of the piston member and the housing member 23. Fluid in the chamber 40 applies a force to the piston member 21 urging it outwardly to effect braking of the vehicle. This force is in addition to the force applied to the piston member 21 by fluid in chamber 45. This causes a greater force to be applied to the trailing brakeshoe 12 urging the trailing brakeshoe 12 outwardly with a force greater than that which urges the brakeshoe 11 outwardly. During braking when the full force is applied to piston 21, piston 20 is seated on housing portion 28. The particular advantages of this type of construction will be described and discussed hereinbelow in great detail.

Referring now to the schematic illustration shown in FIG. 1, to effect braking, fluid is delivered to the various chambers 45 of the brake mechanisms 15 from a master cylinder 50. The master cylinder 50 is connected to the chambers 45 by suitable fluid conduits 50a, illustrated schematically in FIG. 1. Fluid is also delivered to the chambers 40 for applying a greater force to the trailing brakeshoes. Fluid delivered to the chambers 40 is delivered by an intensifier unit 51, to be described hereinbelow.

The master cylinder 50, as shown in FIG. 1, is connected by a fluid conduit 52 to a control unit 53. The control unit 53 is, in turn, connected through a fluid conduit 54 to the intensifier 51. The control unit 53 receives a braking signal from the master cylinder in proportion to the braking force applied by the operator and, in turn, transmits a corresponding signal to the intensifier 51. The intensifier 51 then delivers a proportionally magnified signal to the chambers 40.

The control unit 53 preferably utilizes fluid from the power steering pump to provide the corresponding signal which is transmitted from the control unit 53 to the intensifier 51. It will be apparent from the description hereinbelow, however, that the brake system could be supplied with a fluid by any pump, not necessarily a power steering pump. As shown schematically in FIG. 1, a power steering pump 55 is connected by a fluid conduit 56 to the control unit 53 and the control unit 53 is connected through a fluid conduit 57 to the power steering gear 58 which, in turn is connected to the pump reservoir. The control unit 53 is constructed so as to receive the signal from the master cylinder 50 and transmit a corresponding signal to the intensifier 51 by the use of power steering pump fluid therein.

Figure 2:
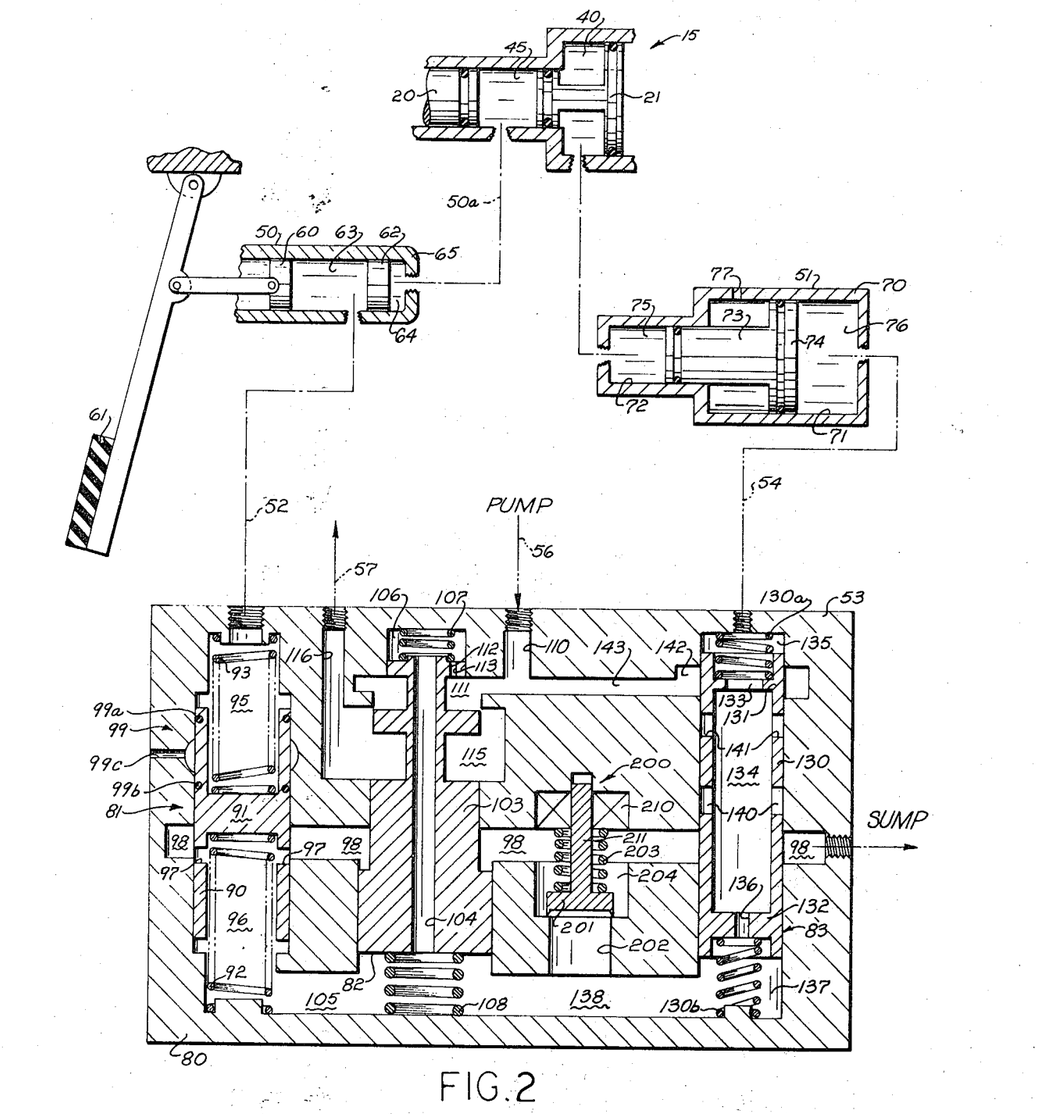
FIG. 2 is a sectional view of various components of the brake system of FIG. 1.

FIG. 2 is a schematic illustration of the preferred embodiment of control unit 53, the master cylinder 50, the intensifier 51, and one of the brake cylinder mechanisms 15. As illustrated in FIG. 2, the master cylinder 50 may be of the tandem type, and has a piston member 60 which is connected with the brake pedal 61 of the vehicle and which is moved upon depression of the brake pedal 61. The master cylinder includes a second piston member 62 spaced from the piston member 60. The piston members 60, 62 define a fluid chamber 63 therebetween. The piston member 62 defines another chamber 64 with the end of the housing 65 of the master cylinder 50. The master cylinder includes conventional return springs, not shown, for the piston members. The chamber 64 of the master cylinder 50 is connected to the chambers 45 of the brake cylinder mechanisms 15, as shown schematically in FIG. 2. The chamber 63 of the master cylinder 50 is connected with the control unit 53 to deliver a signal to the control unit 53 in accordance with the braking force which is applied to the master cylinder 50.

The intensifier unit 51 which receives the signal from the control unit 53 comprises a housing 70. The housing 70 has an enlarged bore 71 and a smaller bore 72 therein. A piston member is located in housing 70 and has a stem portion 73 movable in the bore 72 and has an enlarged piston portion 74 which is movable in the bore 71. Suitable O-rings or other seal means, are provided to prevent fluid leakage past the portions 73, 74 of the piston member. The left end of the intensifier unit 51, as viewed in FIG. 2, includes a chamber 75, and as the piston member moves toward the left, as viewed in FIG. 2, fluid in the chamber 75 is delivered into the chamber 40 of the brake cylinder mechanism 15.

The piston member is moved so as to deliver fluid pressure to the chamber 40 of the brake cylinder mechanism 15 upon receipt of a fluid pressure signal in a chamber 76 at the opposite end of the intensifier unit. The chamber 76 is defined by the right end portion of the housing 70 and the enlarged portion 74 of the piston member 73. It should be apparent that due to the differences in the diameters and effective areas on which the subject fluid pressures act, the pressure created in chamber 75 will be greater than that delivered to the chamber 76 by the ratio of the effective areas. Thus, while a relatively low-pressure signal may be received in the chamber 76, a substantially higher pressure is created in the chamber 75, and thus in the chamber 40 of the brake cylinder mechanism 15. The chamber 75 of the intensifier unit contains brake fluid as does the master cylinder. Chamber 76 of the intensifier unit receives power steering fluid. This separation of fluid is provided to be compatible with the current state of the art of brake and pump fluids; however, it is possible to use like fluids in both systems as the important consideration is fluid pressure and not the fluid per se.

The housing 70 of the intensifier unit 51 is provided with an opening 77 therein which is positioned to the left of the enlarged portion 74. This prevents air from being compressed between the enlarged portion 74 of the piston member and the housing 70, which compression would oppose movement of the piston member 73.

From the above description, it should be apparent that the force applied to the brake pedal is transmitted to the master cylinder 50, and from the master cylinder 50 is delivered to each of the brake cylinder mechanisms 15 in order to effect actuation thereof. Moreover, a pressure signal is also transmitted from the master cylinder 50 to the control unit 53. This pressure signal, or one controlled in accordance therewith, is transmitted from the control unit 53 through the media of the pumping fluid to the intensifier 51. The intensifier 51 delivers a fluid pressure to the chambers 40 of each of the brake cylinder mechanisms 15 in order to apply a greater force to the trailing brakeshoes of the vehicle brake assemblies than is applied to the leading brakeshoes thereof.

The control unit 53 which receives the signal from the master cylinder 50 and transmits a corresponding signal to the intensifier unit 51 and which is preferably used in the present system is a novel control unit. The control unit 53, as shown in FIG. 2, includes a housing 80. The housing 80 supports a signal valve 81, a servovalve 82 and a rate vale 83. These valves 81, 82 and 83 cooperate to receive the control pressure signal from the master cylinder 50 and transmit a corresponding pressure signal through the pumping fluid to the intensifier unit 51.

The signal valve 81 comprises a valve body having a sleeve portion 90 and a portion 91 which extends transverse to the axis of the sleeve portion 90 and is located centrally thereof. The signal valve is biased to a normal position by springs 92, 93 which engage opposite surface portions of the central abutment portion 91 of the valve and act in opposition to position the valve 81, with respect to the housing 80 and a relief 98.

The upper portion of the sleeve 90 and the housing 80 define a chamber 95 which communicates with the chamber 63 of the master cylinder 50 through fluid conduit 52. The chamber 95 and the chamber 63 contain brake fluid. Of course, an increase in the pressure in the chamber 63 effects an increase in the pressure of the brake fluid in the chamber 95.

The lower portion of the signal valve 81, as illustrated in FIG. 2, defines with the housing 80 a fluid chamber 96. The fluid chamber 96 is supplied with pumping fluid, as will be described hereinbelow. Openings 97 in the sleeve member 90 communicate the chamber 96 with the surrounding relief chamber 98 which is connected with the sump or reservoir for the steering pump. In the normal position of the signal valve 81, the pump fluid is directed into the chamber 96 and through the openings 97 into the chamber 98 which communicates with the sump. A suitable seal arrangement 99 is provided to block flow of brake fluid and steering fluid therepast. In the event fluid does leak past the seals 99a, 99b, it will be directed out of the housing 80 through passage 99c. The openings 97 are large enough to prevent any significant pressure drop thereacross so long as there is no pressure signal from the master cylinder 50.

In the embodiment illustrated in FIG. 2, the servovalve 82 is constructed to deliver the steering pump fluid to the chamber 96. In the embodiment shown in FIG. 2, the servovalve 82 includes a valve body 103 having a flow passageway 104 extending therethrough. The flow passageway 104 communicates with a chamber portion 105 at the lower end of the valve body 103, and a chamber portion 106 at the upper end thereof, as illustrated in FIG. 2. A pair of springs 107, 108, respectively, act on the opposite ends of the valve body 103 and bias the valve body 103 into an open or neutral position, shown in FIG. 2.

The steering pump fluid is delivered from the steering pump into the control unit 53 and, specifically, into a fluid passageway 110. The passageway 110 communicates with a fluid chamber 111. The fluid chamber 111 communicates with the chamber 106 through a suitable orifice 112 provided in a flange portion 113 at the upper end of the valve body 103. The flange portion 113 is positioned in the chamber 106 and the outer peripheral surface thereof slidably engages the walls of the chamber 106. The pump fluid which is delivered into the chamber 106, by means of the orifice 112, flows through the flow passageway 104 in the valve body 103 and into the chamber 105 which, as noted hereinabove, is in communication with the chamber 96. As described hereinabove, the fluid in the chamber 96 is communicated to the reservoir through the ports 97 in the sleeve 90 of the signal valve 81.

Figures 4, 5, 6, 7:
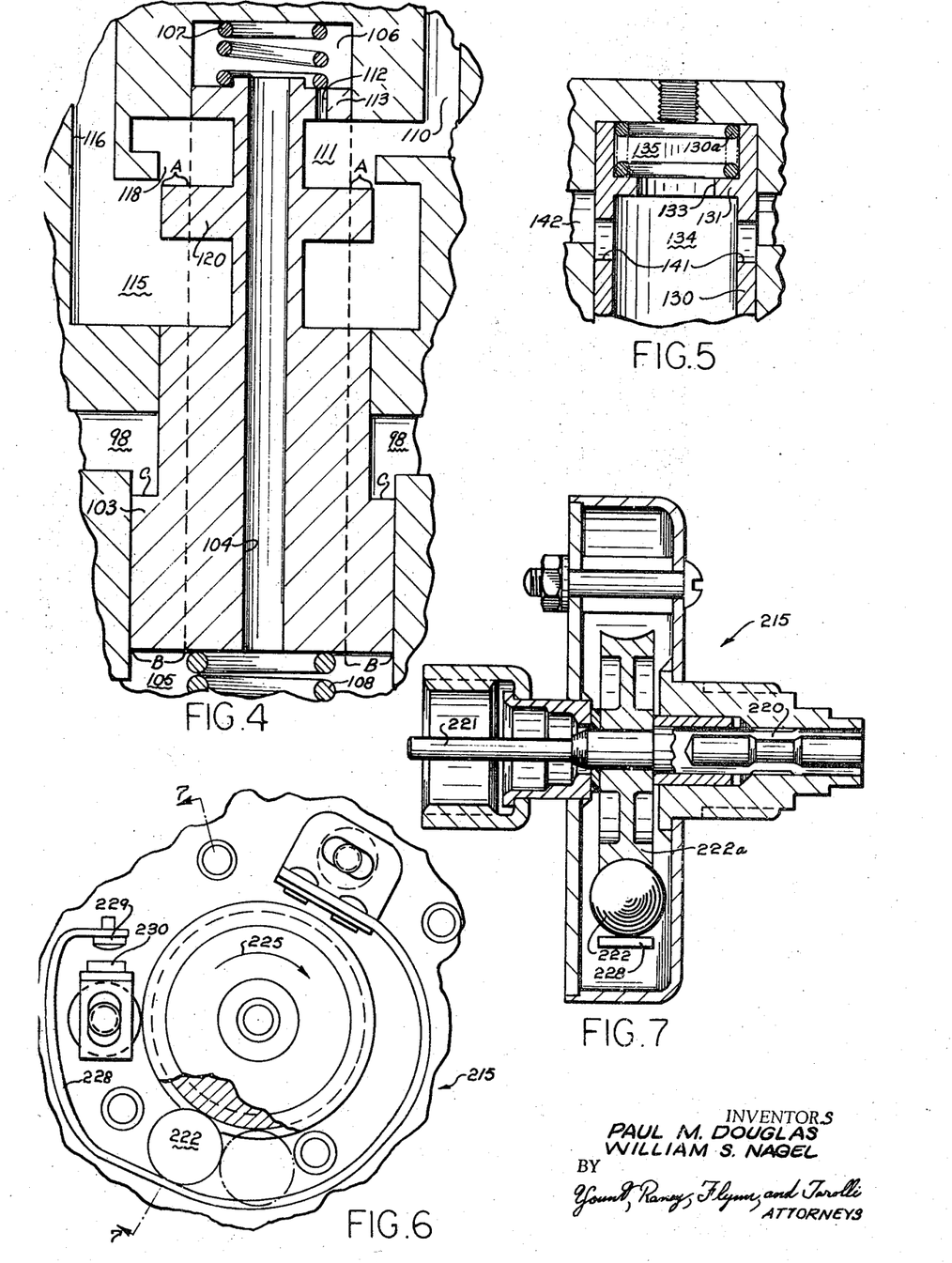
FIG. 4 is an enlarged fragmentary sectional view of a portion of the brake system shown in FIG. 2.
FIG. 5 is an enlarged fragmentary sectional view of another portion of the brake system shown in FIG. 2.

The steering pump fluid is directed to the steering gear 58 through the control unit 53, and to this end, when the servovalve body 103 is in its normal position as shown in FIG. 4, the chamber 111 communicates with a fluid chamber 115 defined by the valve body 103 and the housing 80 of the control unit 53. The chamber 115, in turn, communicates through a fluid passageway 116 and a suitable fluid conduit 57 with the steering gear. The flow of steering pump fluid from the chamber 111 and into the chamber 115 occurs continuously but with a pressure drop which is a function of the axial dimension of the passageway, designated 118 in FIG. 4. The narrow passageway 118 is provided by an edge portion of the housing 80 and an adjacent edge portion of an annular flange 120 of the valve body 103.

The rate valve 83 comprises a sleeve member 130 having inwardly directed abutments 131, 132 at the opposite ends thereof. The flange portion 131 has an opening 133 therein which communicates a central chamber 134, defined by the sleeve member 130, with a chamber 135 defined by the upper end of the sleeve member 130 and the housing 80 of the control unit 53. The flange portion 132 has an orifice 136 therein which communicates the central chamber 134 of the sleeve member 130 with a chamber 137 located beneath the sleeve member 130, as illustrated in FIG. 2. Springs 130a and 130b act in opposition on the flange portions 131, 132 and bias the rate valve 83 into the position shown in FIG. 2.

The chamber 137 communicates with the chamber 105 by a suitable chamber portion or passageway 138 which interconnects chambers 105, 137. It should be apparent that the chamber 137 also communicates with the chamber 96 in view of the fact that the chamber 96 is in communication with the chamber 105.

The sleeve 130 of the rate control valve 83 contains two sets of ports 140 and 141. Upon upward movement of the sleeve 130, the ports 141 communicate with an annular chamber 142 in the housing 80, as shown in FIG. 5. The chamber 142 communicates with the chamber 111 by a suitable fluid conduit passageway 143. Thus, the chamber 142 is provided with pump fluid at substantially the pressure of the fluid in the chamber 111 which is substantially the discharge pressure of the steering pump since the fluid flows unimpeded to chamber 111.

The fluid ports 140 are adapted to communicate with the chamber 98 in the housing 80 upon downward movement of the valve sleeve 130, as viewed in FIG. 2. Of course, the chamber 98 communicates with the sump and thus the fluid in the chamber 134 will be communicated with the sump upon downward movement of the valve to a location where the ports 140 communicate with the chamber 98.

From the above description, it should be apparent that during periods when the steering gear 58 is not demanding any steering pump pressure, there being, however, a nominal pump output pressure in the amount of line losses, and there is no braking being demanded of the vehicle, the steering pump fluid is directed from the steering pump 55 into the fluid conduit 110 and into the chamber 111. From chamber 111, a very small amount of fluid flows through the orifice 112 and experiences the above line loss pressure drop upon flowing therethrough into the chamber 106. This fluid then flows through the fluid conduit 104 and into the chamber 105 and from the chamber 105 into the chamber 96 beneath the signal valve 81. The fluid then flows from the chamber 96 through the ports 97 into the chamber 98 and from the chamber 98 into the sump. Moreover, the greatest volume of steering pump fluid flows from chamber 111 through passageway 118 to the steering gear and then to the sump, and without braking demand the flow through the passageway 118 is practically without pressure loss.

When the pump 55 is pumping steering fluid through the control unit 53, the servovalve body 103 is in a position depending upon the pressures acting thereon and normally is in the position shown in FIG. 4.

This position effects little or no pressure drop in the fluid as it flows through passageway 118. The valve body 103 has an unbalance of surface areas on which the pressure acts. This area unbalance is created by the difference in areas contained on the three diameters of valve body 103. The locations of these area differences are such that pump pressure acts on annular area A, and for a pressure force equilibrium of the valve, this pump pressure force must be balanced by the pressure in chamber 105 acting on an annular area B. Since area B is greater than area A, the valve thus insures that pump pressure is always greater than the pressure in chamber 105.

Should the steering gear require pump pressure, as when steering is being effected, there will be an increase in the pressure in chamber 115. The valve body 103 will, because of this increased pressure in the chamber 115 and the subsequently increased pressure in chamber 111 caused by the demand, move downwardly. This will tend to further open the already large passageway 118 to a greater extent for flow of steering pump fluid to the steering gear 58. Thus, steering demand places no greater than normal load on the pump and the control unit 53 has no detrimental effect on the steering operation.

In the event that there is no demand for steering pump pressure by the steering gear 58, namely, when no steering is being effected of the vehicle, and the brake mechanism is actuated, a pressure signal is received in the chamber 95. This pressure signal in the chamber 95 causes the signal valve 81 to move downwardly since the pressure in chamber 96 is reservoir pressure, and thus partially close ports 97 and restrict flow into chamber 98. This causes a pressure to be created in chambers 96 and 105 beneath the valve body 103. There is thus an increase in pressure in chambers 106 whose net effect is to disrupt the force equilibrium of the valve body 103. This disruption is such that the valve 103 moves in the direction to close passageway 118 and thus create a pressure in the pump flow and hence create a pressure in chamber 111. Thus, the pump pressure is maintained proportionately above that required for braking in chamber 105.

The increase in pressure in the chamber 105 is directed to the chamber 137 beneath the sleeve 130 of the rate valve 83. The orifice 136 causes a pressure drop to be effected between the chamber 137 and the chamber 134. This pressure drop causes the rate valve sleeve 130 to move upwardly an amount to bring the ports 141 into communication with the chamber 142. When this occurs, the power steering pump pressure is directly communicated with the intensifier chamber 76. The purpose of this communication is primarily to supply the intensifier chamber 76 with a relatively large volume of steering pump fluid because the volume of the intensifier chamber 76 is relatively large, and the required amount of fluid could not readily be delivered through the orifice 136 in the required time, since this flow in turn must originate from orifice 112. Filling of the intensifier chamber 76 causes the intensifier piston to move to the left in the bores 71 and 72 and effect the application of a braking force on the trailing brakeshoes of the vehicle.

When the intensifier chamber 76 has been filled and the pressure therein substantially equalizes with the pressure in the chamber 137, the sleeve member 130 will return downwardly and the ports 141 will no longer communicate with the chamber 142 and thus the pressure will be maintained in the chamber 76 by means of the action at the signal 91 and servovalves 103 above. Thus, the rate valve 83 is only called upon when substantial changes are required of the intensifier.

When the braking effort is released, that is, when the brake pedal 61 is released, the pressure in the chamber 95 is reduced, causing the signal valve sleeve 90 to move upwardly as viewed in FIG. 2. This upward movement of the signal valve sleeve 90 brings the ports 97 into more direction communication with the chamber 98, thereby causing a reduction in the pressure in the chamber 96. There is a corresponding reduction in the pressure in the chamber 137 and flow will occur through the orifice 136 in a downward direction, as viewed in FIG. 2, from the intensifier chamber 76. This causes a pressure drop in a downward direction across the orifice 136, and causes the sleeve 130 to move downwardly. The orifice 136 is not necessary to the pressure drop, and the same pressure differentials will exist across abutment portion 132 without the orifice 136. The orifice adds a bit of damping for the unit. As the sleeve 130 moves downwardly, the ports 140 move into communication with the chamber 98, which, of course, is directly connection to the sump. This provides a direct communication for the intensifier chamber 76 to the sump, thereby dumping the fluid which has been added to the intensifier chamber 76 to the sump in a quick effective manner immediately upon release of the braking effort. Without this action of rate valve 83, chamber 76 would necessarily be emptied through the very small ports 97.

As noted hereinabove, the control unit 53 provides little effect on the steering mechanism when no braking is effected, and is readily effective to provide improved braking when no steering of the vehicle is being effected. The control unit 53 is also effective to provide power-assisted braking concurrently with steering. As noted hereinabove, the pressure in the chamber 115 increases when there is a demand for pumping fluid pressure at the steering gear. Moreover, as noted hereinabove when there is a demand for braking, the pressure in the chamber 105 increases, tending to increase the pressure in chamber 111. The combined result of these two pressure changes acting on the valve body 103 causes the valve body 103 to move upward or downward from the position shown in FIG. 4, accordingly as the pressure developed by steering is respectively less than or greater than that required of the pump for braking purposes. When the piston moves in this manner, in accordance with both steering and braking demands, the pressure behavior in passages 96, 105, 106, 138 and 137 and the behavior of the rate valve 130 are the same as previously described.

The control unit 53 also includes a pressure release valve arrangement, designated 200. The pressure release valve arrangement 200 comprises a valve member 201 associated with a passageway 130. The valve 201 is biased in a downward direction, as viewed in FIG. 2, by a spring 203. The spring 203 maintains the valve 201 in a sealed position relative to passage 202, preventing fluid flow through the passageway 202 past the valve. If the pressure in the passageway 138 becomes excessive, such that the pressure force on the valve 201 exceeds the spring-biasing force, the valve 201 will open and fluid may flow from the passageway 138 through the passageway 202 into the chamber 204 which communicates with the chamber 98 which is connected to the sump. Thus, the valve member 201 will move to relieve and maintain the pressure in chamber 138 at a predetermined maximum, regardless of the efforts of the signal valve 81 and the servovalve 103.

The valve arrangement 200 is also constructed so as to render the control unit 53 inoperative to deliver pumping fluid to the intensifier unit 51 when the automotive vehicle is going in a reverse direction. To this end, the pressure release arrangement 200 includes electrical solenoid windings 210. The solenoid windings 210 cooperate with the stem 211 of the valve 201, herein acting as a solenoid plunger. The solenoid winding 210, when energized, causes the valve 201 to move to an open position, whereby the valve member 201 is operative to communicate chamber 138 with the reservoir line 98. Thus, pressure creation in chamber 138 is prevented.

The solenoid 210 is energized when the vehicle is moved in a reverse direction. To this end, a suitable switch mechanism 215 is provided for energizing the solenoid 210 upon the vehicle moving in a reverse direction. The switch mechanism 215 is shown in FIGS. 6 and 7. The switch mechanism 215 includes a drive connection 220 which is connected to the speedometer cable of the vehicle. The switch also includes a drive connection 221 which is connected to the speedometer so as to provide a drive from the speedometer cable to the speedometer in the vehicle. When the vehicle is moving in a forward direction, a ball member 222 of the switch 215 is held in the position shown in full lines in FIG. 6 by a rotating cam member 222a carried by a portion of the switch which is driven in the direction of the arrow 225, as shown in FIG. 6. When the ball is in the full line position, it allows the spring member 228 to assume the position illustrated in FIG. 6. When the spring member 228 is in this position, a switch contact 229 on the outer end of the spring member is out of engagement with the switch contact 230 carried by the switch housing.

When the vehicle is driven in the reverse direction, the cam member 222a is rotated in a direction opposite the direction indicated by the arrow 225 shown in FIG. 6. In this event, the ball member 222 is moved to the dotted line position shown in FIG. 6, and in the dotted line position shown, the ball member 222 causes the switch contacts to close causing energization of the solenoid 210. When the solenoid 210 is energized, the valve member 201 within control unit 53 is moved to its open position, and the control unit 53 is rendered inoperative to deliver steering pump fluid to the intensifier unit 51.

From the above description, it should be readily apparent that an improved brake system has been provided which delivers a greater braking force to the trailing brakeshoe of a vehicle than to the leading brakeshoe when the vehicle is moving in a forward direction. This greater force applied to the trailing brakeshoe causes the brakeshoe to shift during braking into a position wherein the piston 20 serves as an anchor for the braking effort applied by the piston for the rear brakeshoe. Specifically, the flange portion 27 of the piston 20 contacts the housing 23.

This is contrary to "duoservo" brake operation where a common anchor pin serves to react trailing shoe forces for both forward and reverse braking. This is due to the fact that in "duoservo" brake application, the actuation forces delivered to the leading and trailing brakeshoes are substantially equal, but during braking the force delivered to the leading brakeshoe is multiplied by the braking action in the direction of wheel rotation, and this multiplied force is delivered through the brakeshoes to the common reaction pin. In fact, the brakeshoes shift in the direction of wheel rotation as a result of the force application thereto.

In accordance with the present invention, the leading brakeshoe piston acts as the mechanical stop against which the excess primary shoe forces are reacted. Thus, the force applied to the trailing brakeshoe is sufficiently greater than the force applied to the leading brakeshoe that shifting of the brakeshoes in the direction of wheel rotation is prevented. In fact, the force is greater than the multiplied force so as to shift the brakeshoes in the reverse direction so that the leading brakeshoe piston serves as the above-mentioned mechanical stop. The force applied to the trailing brakeshoe preferably is thus greater than the expected multiplied input force. The degree to which this multiplied force is exceeded is the degree to which the braking torque is in excess of that normally generated by a given pedal force or master cylinder pressure.

The major advantage of the construction described hereinabove wherein the trailing brakeshoe has the greater force applied thereto is that the application of the force to the trailing brakeshoe minimizes the effects of changes in the coefficient of friction between the brake drum and the brakeshoes. The minimizing of the effects of changes in the coefficient of friction should be readily apparent upon reviewing the graph shown in FIG. 8. The graph shown in FIG. 8 shows that through the normal leading or duoservo application of the brakes the curve A of braking torque at constant input force versus coefficient of friction is similar to an exponential function, and it should be apparent that for a given increase in coefficient of friction, the braking torque changes radically at high coefficients which is illustrated in the region of curve A designated X. Moreover, in the portion of the curve designated Y, a change in the coefficient of friction will effect a much smaller and less rapid change in the braking torque which results.

The curve designated B in FIG. 8 is a curve illustrating the characteristics of the trailing brake system. It should be apparent from this curve that as the coefficient of friction decreases, the decrease in braking torque is minimized, as illustrated by the portion Y' of the curve, and as the coefficient of friction increases, the braking torque increase is also minimized, as indicated by the portion X' of the curve. Thus this system is not subject to the magnitude of brake fade which is inherent in curve A, and maintains a suitable brake torque to stop the vehicle, even though there is a large change in coefficient of friction. Thus it is that the trailing brake system provides a relatively consistent braking torque output for a given pedal force input even though there are substantial changes in the coefficient of friction between the drum and the brake lining. The curve B is a curve of the equation of 1 minus the reciprocal of an exponentiallike function with the exponent containing, in part, the coefficient of friction. This curve inherently follows from the present system and it should be apparent, therefore, that the present system provides substantial improvements in braking.

An additional and substantial function of the present system is that the system is operative to provide normal leading or duoservo braking operation in the event of a failure in the steering pump system. In such an event, braking fluid would still be delivered into the chamber 45 causing the piston members 20, 21 for the trailing and leading brakeshoes to be actuated with the same force as in known braking systems. Thus, the present system is fail safe in that a failure in the steering pump operation would not render the braking system ineffective. Additionally, should a single failure occur in the circuit feeding chamber 45, the power steering portion of the system together with the control unit 53 and intensifier 51 will continue to deliver a substantial force to the trailing shoe, thus providing excellent braking under these failure conditions. The tandem master cylinder allows continuing pressure input to the control unit 53 even though the other circuit 50a, shown in FIG. 2, has failed.

It should be apparent from the above that the applicants have provided a highly improved brake system which is novel in construction and that certain modifications, changes, and adaptations may be made therein by those skilled in the art to which it relates, and it is hereby intended to cover all such modifications, changes, and adaptations which come within the scope of the appended claims.

We claim:

1. A mechanism for braking a wheel of a vehicle comprising a pair of brakeshoes associated with the wheel of the vehicle, means mounting said brakeshoes for actuation between braking and nonbraking conditions, a fluid actuated mechanism operatively associated with said brakeshoes for effecting movement of said brakeshoes from their nonbraking to their said braking condition, said fluid actuated mechanism including a first piston member operatively connected with one of said brakeshoes and a second piston member operatively connected with the other of said brakeshoes, a first fluid chamber means located between said piston members with fluid in said first fluid chamber means acting upon said piston members urging said piston members apart, and a second fluid chamber means separate from said first fluid chamber means and fluid in said second fluid chamber means applying a force to only one of said piston members urging said one piston member away from the other piston member, one of said brakeshoes being the leading brakeshoe and the other the trailing brakeshoe as the vehicle moves in a forward direction, the force applied to the leading brakeshoe by said first piston member connected therewith being applied to the trailing brakeshoe and being increased during braking when the vehicle is moving in a forward direction, said second piston member receiving the increased force from said trailing brakeshoe, said second fluid chamber acting upon said second piston member to actuate the trailing brakeshoe to apply a force to the trailing brakeshoe greater than the increased force, the force application effecting changes in the braking torque applied to the vehicle wheel as a function of the changes in the coefficient of friction between the brakeshoes and the brake drum, the changes in braking torque being in accordance with the function of 1 minus the reciprocal of an exponentiallike function with said coefficient of friction constituting in part the exponent.

2. A mechanism for receiving a fluid signal from a brake master cylinder and employing pump fluid for transmitting said signal comprising a housing having a pump fluid inlet and outlet, a signal valve member urged in one direction by said master cylinder fluid and movable in said one direction upon receipt of a signal from said master cylinder, said signal valve having means associated therewith for increasing the pressure of said pump fluid upon movement thereof, a control valve means movable upon said increase in pressure of said pump fluid to deliver pump fluid from said control unit as an output signal therefrom in accordance with the signal received from said master cylinder, said control valve comprising a valve member, a chamber containing pump fluid at one end of said valve member and fluid therein acting on said valve member to effect movement of said valve member, said valve member including means for communicating the pump fluid with an outlet from said control unit for said output signal, and said control valve member comprising a sleeve member and further including an intensifier unit to which pump fluid is directed from said control unit and said sleeve member comprising first parts which direct pump fluid to said intensifier unit upon movement of said signal valve and second ports which communicate the intensifier unit with the pump reservoir when the pump fluid pressure in the intensifier unit is to be relieved.

3. A mechanism for receiving a fluid signal from a brake master cylinder of a vehicle and employing pump fluid for transmitting said signal, said mechanism comprising a housing having a pump fluid inlet adapted to be connected to a pump and a pump fluid outlet adapted to be connected to a mechanism operated thereby, a servovalve member in said housing operable to allow the flow of pump fluid from said inlet to said outlet, a signal valve member in said housing movable upon receipt of a signal from said master cylinder, means associated with said signal valve for increasing the pressure of said pump fluid upon movement of said signal valve, said servovalve member having an unbalance of surface areas with pump fluid acting thereon and said increase in pump fluid pressure tending to effect movement of said servovalve, and means for effecting movement of said servovalve to allow more fluid flow to said outlet upon a demand for pump fluid by said mechanism, said servovalve member being operable to allow fluid flow at all times to said outlet and having a portion which defines a metering edge with a portion of said housing and providing said flow.

4. A mechanism for receiving a fluid signal from a brake master cylinder of a vehicle and employing pump fluid for transmitting said signal, said mechanism comprising a housing having a pump fluid inlet adapted to be connected to a pump and a pump fluid outlet adapted to be connected to a mechanism operated thereby, a servovalve member in said housing operable to allow the flow of pump fluid from said inlet to said outlet, a signal valve member in said housing movable upon receipt of a signal from said master cylinder, means associated with said signal valve for increasing the pressure of said pump fluid upon movement of said signal valve, said servovalve member having an unbalance of surface areas with pump fluid acting thereon and said increase in pump fluid pressure tending to effect movement of said servovalve to allow more fluid flow to said outlet upon a demand for pump fluid by said mechanism, said servovalve member and said housing defining a pump fluid chamber which receives pump fluid from said pump, said servovalve member having a flange portion defining one side of said pump fluid chamber, an orifice in said flange portion communicating the pump fluid chamber with a fluid chamber located on the other side of said flange portion, and said servovalve member and housing defining a narrow metering edge for direction pump fluid from said pump fluid chamber to a fluid outlet chamber which communicates with said pump fluid outlet.

5. A mechanism for braking a wheel of a vehicle comprising a pair of brakeshoes associated with the wheel, means supporting said brakeshoes for actuation between braking and nonbraking conditions, one of said brakeshoes being the leading brakeshoe and the other being the trailing brakeshoe as the vehicle moves in a forward direction, actuating means for actuating said brakeshoes into braking condition and for preventing shifting of said brakeshoes when actuated in the direction of forward wheel rotation including force applying means for applying a greater actuating force to the trailing brakeshoe than the actuating force applied to the leading brakeshoe, additional means for rendering said force applying means ineffective to apply a greater force to said trailing brakeshoe during reverse movement of the vehicle, said actuating means for applying a force to each of said brakeshoes being effective to apply equal forces to both of said brakeshoes during reverse movement of the vehicle, said actuating means comprising a pair of piston members having a fluid chamber therebetween with an additional fluid chamber acting upon the piston member for actuating the trailing brakeshoe and a control unit operative to direct fluid pressure into said second chamber so as to effect actuation of the trailing brakeshoe with said greater force, and said additional means comprising means for rendering said control unit inoperative during reverse operation of the vehicle, said means for rendering said control unit inoperative comprising a valve member movable to vent the control unit to a sump and switch means actuated upon reverse operation of the vehicle and operable to actuate said valve means to its open condition.

6. A mechanism for braking a wheel of a vehicle comprising a pair of brakeshoes associated with the wheel, means supporting said brakeshoes for actuation between braking and nonbraking conditions, one of said brakeshoes being the leading brakeshoe and the other being the trailing brakeshoe as the vehicle moves in a forward direction, fluid actuated means for applying a force to each of said brakeshoes to actuate said brakeshoes into braking condition with the force applied to the trailing brakeshoe being greater than the force applied to the leading brakeshoe, a master cylinder operatively connected with said fluid actuated means to effect the application of a force to said leading brakeshoe, a fluid source independent of said master cylinder, and means interconnecting said fluid source and said fluid actuated means for effecting the application of at least a part of the force to the trailing brakeshoe, said fluid actuated means comprising a first piston member operatively connected with the leading brakeshoe and a second piston member operatively connected to the trailing brakeshoe, a first fluid chamber means for receiving fluid from said master cylinder with fluid therein acting on said piston members, and second fluid chamber means separate from said first fluid chamber means and fluid in said second fluid chamber means applying a force only to said second piston member, said means interconnecting said fluid source and said fluid actuated means including an intensifier unit for receiving fluid from said independent source and operable to transmit a relatively high pressure to said second fluid chamber and further including a control unit operable to receive a brake signal from said master cylinder and transmit a control signal to said intensifier unit in accordance with said brake signal, said control unit being operatively connected to said fluid source for directing fluid therefrom to said intensifier unit upon receipt of a brake signal.

7. A mechanism for braking a wheel of a vehicle comprising a pair of brakeshoes movable into engagement with a brake drum associated with the wheel, means supporting said brakeshoes for actuation between braking and nonbraking conditions, one of said brakeshoes being the leading brakeshoe and the other being the trailing brakeshoe as the vehicle moves in a forward direction, fluid actuated means for applying a force to each of said brakeshoes to actuate said brakeshoes into engagement with the drum and for preventing throughout braking shifting of said brakeshoes in the direction of forward wheel rotation, a master cylinder operatively connected with said fluid actuated means to effect the application of the force to said leading brakeshoe, a fluid source independent of said master cylinder, and means interconnecting said fluid source and said fluid actuated means for effecting the application of at least a part of the force to the trailing brakeshoe, said fluid actuated means comprising a first piston member operatively connected with the leading brakeshoe and a second piston member operatively connected to the trailing brakeshoe, a first fluid chamber means for receiving fluid from said master cylinder with fluid therein acting on said piston members, and second fluid chamber means separate from said first fluid chamber means and fluid in said second fluid chamber means applying a force only to said second piston member, said means interconnecting said fluid source and said fluid actuated means including an intensifier unit for receiving fluid from said independent source and operable to transmit a relatively high pressure to said second fluid chamber, said force applied to the trailing brakeshoe being at least equal to the increased force applied to the actuating means by the trailing brakeshoe due to self-energization of the brakeshoes to prevent said shifting.

8. A mechanism for braking a wheel of a vehicle comprising a pair of brakeshoes movable into engagement with a brake drum associated with the wheel, means supporting said brakeshoes for actuation between braking and nonbraking conditions, one of said brakeshoes being the leading brakeshoe and the other being the trailing brakeshoe as the vehicle moves in a forward direction, actuating means for actuating said brakeshoes into engagement with the drum and for preventing throughout braking shifting of said brakeshoes in the direction of forward wheel rotation, said actuating means including force applying means for applying a greater actuating force to the trailing brakeshoe to move the trailing brakeshoe into contact with the drum than the actuating force applied to the leading brakeshoe to move the leading brakeshoe into contact with the drum, said actuating force applied to the trailing brakeshoe being at least equal to the increased force applied to the actuating means by the trailing brakeshoe due to self-energization of the brakeshoes to prevent said shifting, a master cylinder operatively connected with said actuating means for effecting the application of the actuating force to the leading brakeshoe, a fluid source independent of said master cylinder, and means interconnecting said fluid source and said actuating means for effecting the application of at least a part of said greater actuating force to the trailing brake shoe.

9. A mechanism for braking a wheel of a vehicle comprising a pair of brakeshoes movable into engagement with a brake drum associated with the wheel, means supporting said brakeshoes for actuation between braking and nonbraking conditions, one of said brakeshoes being the leading brakeshoe and the other being the trailing brakeshoe as the vehicle moves in a forward direction, actuating means for actuating said brakeshoes into engagement with the drum and for preventing throughout braking shifting of said brakeshoes in the direction of forward wheel rotation, said actuating means including force applying means for applying a greater actuating force to the trailing brakeshoe to move the trailing brakeshoe into contact with the drum than the actuating force applied to the leading brakeshoe to move the leading brakeshoe into contact with the drum, said actuating force applied to the trailing brakeshoe being at least equal to the increased force applied to the actuating means by the trailing brakeshoe due to self-energization of the brakeshoes to prevent said shifting, and additional means for rendering said force applying means ineffective to apply a greater force to said trailing brakeshoe during reverse movement of the vehicle.

10. A mechanism for braking a wheel of a vehicle comprising a pair of brakeshoes associated with the wheel of the vehicle, means mounting said brakeshoes for actuation between braking and nonbraking conditions, a fluid actuated mechanism operatively associated with said brakeshoes for effecting movement of said brakeshoes from their said nonbraking to their said braking condition, said fluid actuated mechanism including a first piston member operatively connected with one of the brakeshoes and a second piston member operatively connected with the other of said brakeshoes, a first fluid chamber located between said piston members with fluid in said chamber acting upon said piston members urging said piston members apart, a second fluid chamber separate from said first fluid chamber and fluid in said second fluid chamber applying a force to only one of said piston members urging said one piston member away from the other piston member, a master cylinder having a fluid chamber for delivering brake fluid to said first chamber of said fluid actuated mechanism, an intensifier unit for delivering brake fluid to said second chamber of said fluid actuated mechanism, and a control unit operable to receive a brake signal from said master cylinder and transmit a control signal to said intensifier unit in accordance with said brake signal, said control unit being operatively connected to a pump and directing pump fluid to said intensifier unit upon receipt of a brake signal.

11. A mechanism as defined in claim 10 wherein said master cylinder is of the tandem type and includes first and second fluid chambers, means for connecting one of said chambers with said first chamber of said fluid actuated mechanism, and means connecting the other of said chambers to said control unit to transmit a brake signal to said control unit.

12. A mechanism as defined in claim 11 wherein said control unit includes a signal valve member movable upon receipt of the control signal from said brake master cylinder and operable to increase the pump fluid pressure in said control unit upon movement thereof, and a rate control valve movable in response to an increase in the pressure of the pump fluid in said control unit and operable when so moved to direct pump fluid to said intensifier unit.

13. A mechanism as defined in claim 12 wherein said control unit further includes a servovalve operable to direct pump fluid delivered to the control unit to the steering gear, said servovalve having an unbalance of areas thereon in such a manner that pump pressurization due to braking only is continuously minimized, and said servovalve being normally positioned in such a manner as to allow the unimpeded flow of pumping fluid to other fluid mechanism which may be in the pump circuit.

14. A mechanism for braking a vehicle comprising a pair of brakeshoes associated with a vehicle wheel, a brake cylinder mechanism for actuating said brakeshoes to their braking condition, a tandem master cylinder having spaced separate brake fluid chambers, means connecting one of said chambers to said brake cylinder mechanism, a control unit operatively connected with said brake cylinder mechanism, means for directing pump fluid to said control unit, means connecting the other of said chambers of said master cylinder to said control unit to deliver a braking pressure signal to said control unit from said master cylinder, and means in said control unit responsive to the receipt of said braking pressure signal and operable to transmit pump fluid therefrom in accordance with said braking pressure signal and further including an intensifier unit having a braking fluid chamber connected with said brake cylinder mechanism and a pumping fluid chamber operatively connected with said control unit and receiving said pumping fluid therefrom, said intensifier unit including means for multiplying the pumping fluid pressure received to deliver a braking fluid pressure to said brake cylinder mechanism at a higher pressure.

15. A mechanism as defined in claim 14 wherein said pumping fluid comprises steering pump fluid supplied to said control unit by a power steering pump.

16. A mechanism as defined in claim 14 wherein said servovalve member has an unbalance of areas on which said pump fluid acts urging said valve member in a direction tending to cause said servovalve member to move to allow said pump fluid to flow to said pump fluid outlet.

17. A mechanism for receiving a fluid signal from a brake master cylinder and employing pump fluid for transmitting said signal, comprising a housing having a pump fluid inlet adapted to be connected with a fluid pump, said housing having a first pump fluid outlet adapted to be connected with a mechanism to be operated thereby and a second pump fluid outlet adapted to be connected with a brake mechanism, a servovalve in said housing capable of providing a pressure demand on the fluid pump, said servovalve having portions for directing pump fluid from said inlet to said first outlet at all times, a signal valve in said housing operable to receive a fluid pressure signal from said master cylinder and increase the pressure of pump fluid therein, and a flow control valve operable to direct pump fluid from said control unit through said second outlet upon an increase in the pressure thereof in response to braking only.

18. A mechanism as defined in claim 17 wherein said servovalve is movable in one direction in response to a demand for pump fluid by said mechanism and is movable in the other direction in response to a demand for an increase in pressure of said pump fluid for use in braking due to movement of said signal valve.

19. A mechanism as defined in claim 17 wherein said signal valve comprises a sleeve member having ports therein communicating the pump fluid in said control member with a reservoir and which upon movement impedes the flow of pump fluid from the control unit through said ports to effect an increase in the pressure of the pump fluid in the control unit.

20. A mechanism as defined in claim 17 wherein said servovalve member has an unbalance of areas on which said pump fluid acts urging said valve member in a direction tending to cause said servovalve member to move to allow said pump fluid to flow to said first fluid outlet.

21. A mechanism as defined in claim 17 further including a valve means operable to relieve and maintain pump fluid pressure in said control unit, said valve means including a valve member movable to communicate the pump fluid pressure in said control unit with a reservoir.

22. A mechanism for braking a wheel of a vehicle comprising a pair of brakeshoes movable into engagement with a brake drum associated with the wheel, means supporting said brakeshoes for actuation between braking and nonbraking conditions, one of said brakeshoes being the leading brakeshoe and the other being the trailing brakeshoe as the vehicle moves in a forward direction, and actuating means for actuating said brakeshoes into engagement with the drum and for preventing throughout braking shifting of said brakeshoes in the direction of forward wheel rotation, said actuating means including force applying means for applying a greater actuating force to the trailing brakeshoe to move the trailing brakeshoe into contact with the drum than the actuating force applied to the leading brakeshoe to move the leading brakeshoe into contact with the drum, said actuating force applied to the trailing brakeshoe being at least equal to the increased force applied to the actuating means by the trailing brakeshoe due to self-energization of the brakeshoes to prevent said shifting, said force application effecting changes in the braking torque applied to the vehicle wheel as a function of the changes in the coefficient of friction between the brakeshoes and the brake drum, the changes in braking torque being in accordance with the function of 1 minus the reciprocal of an exponentiallike function with said coefficient of friction constituting in part the exponent.

23. A mechanism as defined in claim 22 including additional means for rendering said force applying means ineffective to apply a greater force to said trailing brakeshoe during reverse movement of the vehicle.

24. A mechanism as defined in claim 23 wherein said actuating means for applying a force to each of said brakeshoes is effective to apply equal forces to both of said brakeshoes during reverse movement of the vehicle.

25. A mechanism as defined in claim 24 wherein said actuating means comprises a pair of piston members having a fluid chamber therebetween with an additional fluid chamber acting upon the piston member for actuating the trailing brakeshoe and a control unit operative to direct fluid pressure into said second chamber so as to effect actuation of the trailing brakeshoe with said greater force, and said additional means comprising means for rendering said control unit inoperative during reverse operation of the vehicle.

26. A mechanism for braking a wheel of a vehicle as defined in claim 24 wherein said second force is approximately 9 to 12 times said first force.

UNITED STATES PATENT OFFICE
CERTIFICATE OF CORRECTION

Patent No. 3,550,730          Dated December 29, 1970

Inventor(s) Paul M. Douglas et al.

It is certified that error appears in the above-identified patent and that said Letters Patent are hereby corrected as shown below:

Column 2, line 46, cancel "of a", first occurrence; same column 2, after line 69, insert
-- Fig. 6 is a view of a switch mechanism used
   in connection with the brake system shown in
   Fig. 1;
   Fig. 7 is a sectional view of the switch
   mechanism of Fig. 6 taken along section line
   7-7 of Fig. 6; and --.
Column 5, line 43, "vale" should read -- valve --. Column 8, line 38, "connection" should read -- connected --. Column 11, line 55, "Parts" should read -- ports --.

Signed and sealed this 25th day of May 1971.

(SEAL)
Attest:

EDWARD M. FLETCHER, JR.            WILLIAM E. SCHUYLER, JR.
Attesting Officer                  Commissioner of Patents